United States Patent Office 3,645,970
Patented Feb. 29, 1972

3,645,970
BENZOATE HOMOPOLYMERS HINDERED
PHENOLIC GROUPS AS STABILIZERS
Eduard Karl Kleiner, New York, N.Y., assignor to
Ciba-Geigy Corporation
No Drawing. Continuation-in-part of application Ser. No. 738,770, June 2, 1968. This application Oct. 1, 1969, Ser. No. 862,934
Int. Cl. C08f *19/10;* C07c *69/76*
U.S. Cl. 260—47 U
2 Claims

ABSTRACT OF THE DISCLOSURE

Benzoate monomers containing hindered phenolic groups are derived from $\alpha,\beta$-unsaturated acids and benzoic acids containing hindered phenolic groups. The monomers are polymerized, by a free radical initiator yielding polymers which are stabilized of organic materials against degradation caused by oxidation and ultraviolet light. The polymeric stabilizers can be used alone or in combination with other stabilizers.

This application is a continuation-in-part of copending application Ser. No. 738,770, filed June 2, 1968.

BACKGROUND OF THE INVENTION

The prevention of degradation of various organic materials is of primary industrial concern and therefore stabilizers are employed in a wide variety of commercial products, such as synthetic polymers, oils, etc., which are normally subject to oxidative or ultraviolet deterioration. An example of such stabilizers are compounds containing hindered phenolic groups.

The mechanism of the action of a hindered phenol compound as an antioxidant has not been definitely established. However, it is believe that the hindered phenol acts as a chain-stopper for the free radical chain mechanism of oxidation either by donation of hydrogen or donation of an electron to a free radical involved in the oxidation process or the combination of a free radical with the aromatic ring of the antioxidant either by direct addition or by $\pi$-complex formation.

Since it is generally believed that free radicals, necessary for the polymerization of vinyl- and related monomers, are trapped by antioxidants such as hindered phenols, polymerizations of vinyl monomers carrying a phenolic group or a hindered phenolic group were carried out by a series of steps which included esterification of the phenol group, free radical polymerization of the vinyl group followed by hydrolysis of the ester group to obtain the desired polymeric antioxidant. This procedure is illustrated by S. N. Ushakov et al., U.S.S.R. Pat. 149,888 as follows:

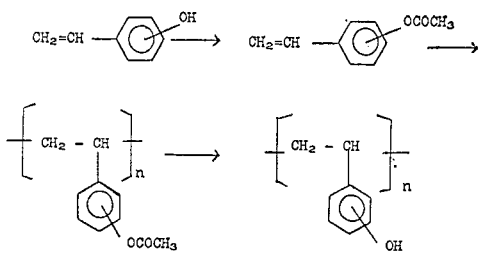

and by G. Manecke+G. Bourwieg, Makromolekulare Chemie, 99 (1966) 175–185 as follows:

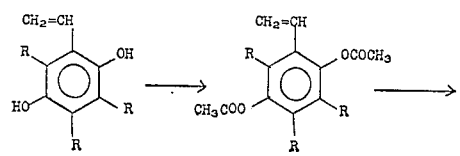

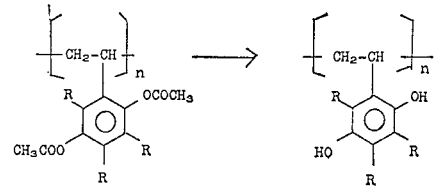

It has now been found that monomers containing hindered groups can be directly polymerized by free alkyl- or aryl-radicals to produce polymeric stabilizers as disclosed in copending application Ser. No. 738,770, filed June 21, 1968.

DETAILED DISCLOSURE

The present invention is directed to novel benzoate monomers containing hindered phenolic groups, a process for their preparation, polymers of said monomers and organic compositions stabilized with such polymers alone or in combination with other stabilizers.

The monomers of this invention have the following general formula:

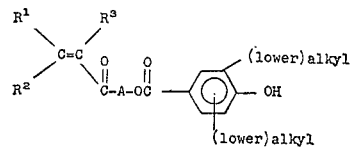

wherein $R^1$, $R^2$ and $R^3$ are independently hydrogen, lower alkyl, phenyl, benzyl or a group

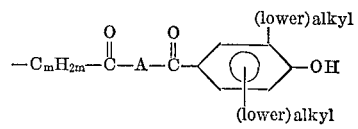

$m=0$ or $1$
A is a bivalent group selected from

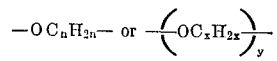

where $n=2$ to 12, $x=2$ to 4, and $y=2$ to 4.

In the above general formula the phenolic group has two alkyl substituents. One alkyl substituent is in a position ortho to the hydroxy group and a second alkyl group is either (a) in the other position ortho to the hydroxy group or (b) in the position meta to the hydroxy group and para to the first alkyl group. Preferred are the di (lower) alkyl-p-phenolic groups wherein the alkyl groups are branched, such as t-butyl or isopropyl. However, other arrangements are also contemplated, such as 3-t-butyl-6-methyl - 4 - hydroxyphenyl group, 3,5-di-isopropyl-4-hydroxyphenyl group, 3,5-di-t-butyl-4-hydroxyphenyl group, 3,5-dimethyl-4-hydroxyphenyl group or 3,5-di-n-hexyl-4-hydroxyphenyl group.

By the term (lower)alkyl is intended a group containing a branched or straight chain hydrocarbon having from 1 to 6 carbon atoms. Illustrative examples of such alkyl groups are methyl, ethyl, isopropyl, n-propyl, t-butyl, n-hexyl, cyclohexyl and the like.

The above described monomers can be prepared by the following two methods:

(1) Esterification of hydroxyalkyl-α,β-unsaturated esters and benzoic acids containing a hindered phenolic group as represented by this equation:

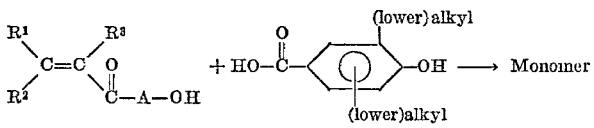

Although benzoic acid can be employed in this method as shown in the equation, it is preferable to employ acid halides, and especially the acid chlorides, or benzoic acid.

Illustrative and non-limiting examples of hydroxyalkyl-α,β-unsaturated esters are listed below.

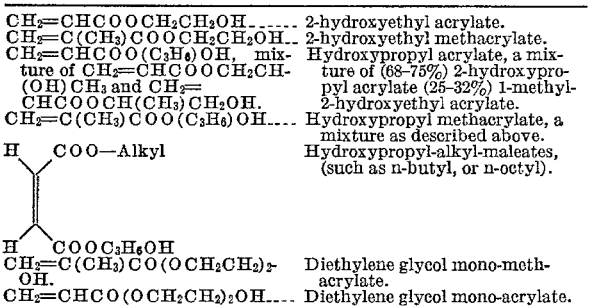

| | |
|---|---|
| $CH_2=CHCOOCH_2CH_2OH$ | 2-hydroxyethyl acrylate. |
| $CH_2=C(CH_3)COOCH_2CH_2OH$ | 2-hydroxyethyl methacrylate. |
| $CH_2=CHCOO(C_3H_6)OH$, mixture of $CH_2=CHCOOCH_2CH(OH)CH_3$ and $CH_2=CHCOOCH(CH_3)CH_2OH$. | Hydroxypropyl acrylate, a mixture of (68–75%) 2-hydroxypropyl acrylate (25–32%) 1-methyl-2-hydroxyethyl acrylate. |
| $CH_2=C(CH_3)COO(C_3H_6)OH$ | Hydroxypropyl methacrylate, a mixture as described above. |
| H COO—Alkyl, H COOC$_3$H$_6$OH | Hydroxypropyl-alkyl-maleates, (such as n-butyl, or n-octyl). |
| $CH_2=C(CH_3)CO(OCH_2CH_2)_2OH$. | Diethylene glycol mono-methacrylate. |
| $CH_2=CHCO(OCH_2CH_2)_2OH$ | Diethylene glycol mono-acrylate. |

Benzoic acids containing hindered phenolic groups and acid chlorides thereof are described extensively in the patent literature, e.g., U.S. 3,285,855. Illustrative examples of useful benzoic acids are listed below:

3,5-dimethyl-4-hydroxybenzoic acid
3,5-diethyl-4-hydroxybenzoic acid
3,5-diisopropyl-4-hydroxybenzoic acid
3,5-di-t-butyl-4-hydroxybenzoic acid
3-methyl-5-t-butyl-4-hydroxybenzoic acid
3-ethyl-5-t-butyl-4-hydroxybenzoic acid
3-methyl-6-t-butyl-4-hydroxybenzoic acid
3-methyl-6-isopropyl-4-hydroxybenzoic acid
3,6-diethyl-4-hydroxybenzoic acid
3,6-di-t-butyl-4-hydroxybenzoic acid and acid chlorides of the above listed benzoic acids.

A detailed description of the preparation of the monomers by this method is contained in Example 1.

(2) Esterification of α,β-unsaturated acids and hydroxyalkyl benzoates as represented by the following equation:

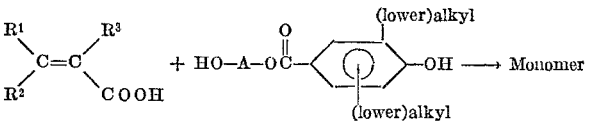

Similarly as in the first method, acids can be employed as shown in the equation, but acid halides, and especially acid chlorides, are preferred.

Illustrative examples of useful α,β-unsaturated acid chlorides are listed below.

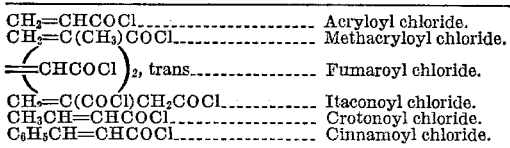

| | |
|---|---|
| $CH_2=CHCOCl$ | Acryloyl chloride. |
| $CH_2=C(CH_3)COCl$ | Methacryloyl chloride. |
| (=CHCOCl)$_2$, trans | Fumaroyl chloride. |
| $CH_2=C(COCl)CH_2COCl$ | Itaconoyl chloride. |
| $CH_3CH=CHCOCl$ | Crotonoyl chloride. |
| $C_6H_5CH=CHCOCl$ | Cinnamoyl chloride. |

The hydroxyalkyl benzoates are preferably prepared by the addition of epoxides, preferably ethylene and propylene oxide, to benzoic acids such as those listed under method (1) above. This is a well known reaction described in Houben-Weyl, Methoden der Organischen Chemie, vol. 14/2, pp. 436–446 (Georg Thieme Verlag, Stuttgart (1962).

Illustrative examples of the monomers of this invention are

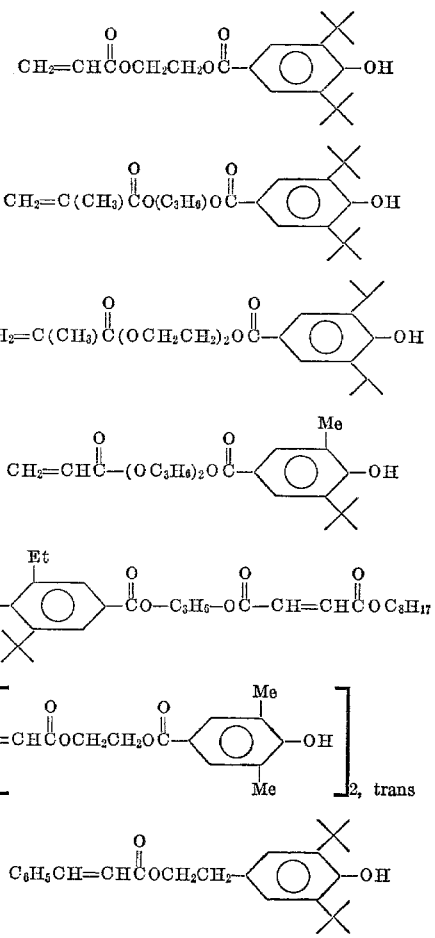

Further embodiments of this invention are the polymers prepared from the above described monomers and their use as stabilizers of organic materials normally subject to oxidative or ultraviolet light degradations. Still another embodiment is a process for the preparation of said polymers which comprises subjecting to polymerizing conditions (a) a monomer derived from an α,β-unsaturated acid and a benzoic acid containing a hindered phenolic group and (b) a free radical initiator. The initiator is a compound which can dissociate into an alkyl- or aryl-radical. Consequently, in the present invention, a single step process is utilized in the preparation of the polymeric stabilizers thereby avoiding the multi-step procedures of the prior art set out above.

Thus, an essential reactant in the preparation of the polymeric stabilizers is an initiator which can react with a monomer to obtain directly, i.e., in one step, the polymeric stabilizers. Included among the initiators are azo-nitriles and azo-derivatives which dissociated into alkyl- or aryl-radicals at temperatures convenient for polymerization reactions. The best known example of an azo-nitrile is 2,2'-azobisisobutyronitrile and the dissociation providing the required alkyl-radical is shown as follows:

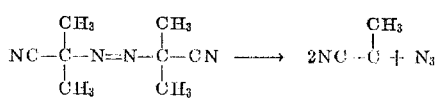

Other azo-nitriles and azo-derivatives which can be used to react with the above described monomers to prepare the desired products of the invention are described in J. Brandrup and E. H. Immergut, Polymer Handbook (John Wiley and Sons) 1965, pages II-3 to II-14 and include, for example 2-cyano-2-propyl-azo-formamide
2,2'-azo-bis-isobutyronitrile
2,2'-azo-bis-2-methylpropionitrile
1,1'-azo-bis-1-cyclobutanenitrile
2,2'-azo-bis-2-methylbutyronitrile
4,4'-azo-bis-4-cyanopentanoic acid
1,1'-azo-bis-1-cyclopentanenitrile
2,2'-azo-bis-2-methylvaleronitrile
2,2'-azo-bis-2-cyclobutylpropionitrile
1,1'-azo-bis-1-cyclohexane nitrile
2,2'-azo-bis-2,4-dimethylvaleronitrile
2,2'-azo-bis-2,4,4-trimethylvaleronitrile
2,2'-azo-bis-2-benzylpropionitrile
1,1'-azo-bis-1-cyclodecane nitrile
azo-bis-(1-carbomethoxy-3-methylpropane)
phenyl-azo-diphenylmethane
phenyl-azo-triphenylmethane
azo-bis-diphenylmethane
3-tolyl-azo-triphenylmethane Certain other peroxide-initiators are similarly useful in preparing the polymeric stabilizers of the present invention, the useful peroxide-initiators being those capable of decomposing instantly into alkyl- or aryl-radicals. The alkyl- or aryl-radical is obtained either by instantaneous decomposition or by a rearrangement reaction of the primary decomposition products of the peroxide compound. Of the peroxides, the aliphatic acyl peroxides are for example, most useful and one preferred aliphatic peroxide is acetyl peroxide. The decomposition of this compound into alkyl-radicals can be set out as follows:

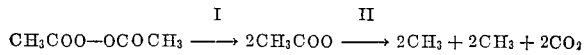

$$CH_3COO-OCOCH_3 \xrightarrow{I} 2CH_3COO \xrightarrow{II} 2CH_3 + 2CH_3 + 2CO_2$$

Reaction II follows Reaction I instantaneously. In the presence of iodine, only $CH_3I$ is isolated; proof of the instantaneous formation of the methyl radical. In addition to acetyl peroxide, lauroyl peroxide and decanoyl peroxide, the preferred peroxides and other aliphatic acyl peroxides containing up to 18 carbon atoms are also useful as initiators for the polymerization of the above monomers. Such peroxide compounds include propionyl peroxide, butyryl peroxide, isobutyryl peroxide, cyclobutaneacetyl peroxide, heptanoyl peroxide, caprylyl peroxide, cyclohexane acetyl peroxide, nonanoyl peroxide, myristoyl peroxide, stearoyl peroxide, and the like.

Still other groups of peroxides that can be employed are the ketone peroxides and aldehyde peroxides. It was found that, using the aforesaid peroxides, only partial polymerization of the benzoate monomers resulted indicating that alkyl radicals were instantaneously formed during the decomposition. However, the ketone peroxides and aldehyde peroxides gave generally lower yields of the polymeric stabilizers and at times yellow-colored polymers were obtained indicating that besides the polymerization, oxidation of the hindered phenolic group also occurred.

The polymers of the present invention include homopolymers of the above described monomers and copolymers thereof with other ethylenically unsaturated monomers. Polymerizaiton of the monomers may be carried out in bulk, solution, suspension or emulsion according to techniques well known to those skilled in the art. The preferred polymerization technique is the solution polymerization procedure using solvents such as benzene, toluene, xylene and other aromatic solvents or chlorinated solvents such as chloroform, tetrachloroethylene, and the like, and initiators as described supra in quantities varying between 0.01% and 2% based upon the weight of the monomers. Polymerization temperatures are dependent upon the initiator used and are usually between 40° and 100° C.

It was also found that, in conducting the polymerization, the solvent could be advantageously replaced by the use of either distearylthiodipropionate or dilaurylthiodipropionate. These compounds are generally known as "synergists" since they increase the effectiveness of antioxidants, including the polymeric benzoates of the present invention. By using either distearylthiodipropionate or dilaurylthiodipropionate as solvents in the polymerizations of the above discussed monomers, two important advantages are obtained: (1) the solvent stripping operation after the polymerization is eliminated and (2) the benzoates polymer-synergist mixture solidifies at room temperature after the polymerization to a white mass which can be easily pulverized. Such powders are preferred as additives as compared with high viscous or solid polymers. The aforesaid synergists are used in ratios of approximately three parts synergist to one part antioxidant.

It should be mentioned that in the preparation of oligomers, that is, lower molecular weight benzoates the polymerization is desirably carried out in the presence of chain transfer agents such as, for example, mercaptans. Illustrative of such chain transfer agents are alkyl mercaptans such as n-octyl, n-dodecyl, n-hexadecyl mercaptans, etc.

Comonomers are important in the syntheses of oligomeric and polymeric stabilizers in that they can modify the physical properties of the polymeric stabilizer, that is, the solubility characteristics as well as the solid state properties of the polymeric stabilizer can be influenced and in addition, the use of expensive monomers can be partially replaced by less expensive comonomers.

The copolymerization behavior of the present monomers is predictable from their monomer class, that is, a monomer of the acrylate or methacrylate type behaves in a manner similar to an alkyl acrylate or alkyl methacrylate. Likewise, a monomer of the fumarate type behaves in a manner similar to that of an alkyl fumarate in a copolymerization. Comonomers that can be used in copolymerization with acrylates, methacrylates. fumarates and itaconates, are well known to those skilled in the art and are described, for example, in detail, in C. E. Schildknecht, "Vinyl and Related Polymers" published by John Wiley and Sons, New York, 1952.

When acrylate and methacrylate monomers of this invention are employed, the preferred comonomers are alkyl (1 to 24 carbon atoms) acrylates and methacrylates, styrenes, vinylesters, butadiene and isoprenes including chlorinated or fluorinated derivatives thereof. When fumarate and itaconate and related itaconate and related diester monomers are employed, the preferred comonomers are vinylethers, vinylesters, alpha-olefins, styrenes and N-vinyl monomers.

The preparation of the above described polymers are illustrated below in Examples 11 to 18.

The polymers of this invention are useful as moderately active antioxidants and as exceptionally good ultraviolet light stabilizers for organic materials which are subject to degradation caused by oxidation or ultraviolet light. Materials which are thus stabilized according to the present invention include synthetic organic polymeric substances such as resins formed from the polymerization of vinyl monomers or from polycondensation reactions, e.g., polyvinyl halides, polyvinyl esters, polymeric aldehydes and unsaturated hydrocarbons such as polybutadienes and polyisoprenes, poly-α-olefins such as polyethylene, polypropylene, polybutylene, and the like, including copolymers of poly-α-olefins, polyurethanes such as are prepared from polyols and organic polyisocyanates; polyamides such as polyhexamethylene adipamide and polycaprolactam, polyesters, such as polymethylene or polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubrication oil of the aliphatic ester types, e.g., di(2-ethylhexyl)azelate, pentaerythritol tetracaproate and the like; animal and vegetable derived oils, e.g., linseed oil, fat, tallow, lard, peanut oil, cod liver oil, castor oil, palm oil, corn oil, cotton seed oil, and the like; hydrocarbon material such as gasoline, mineral oil, fuel oil, drying oil, cutting fluids, waxes, resins, and the like, fatty acids, soaps and the like.

In general the stabilizers of this invention are employed from about 0.05% to about 10% by weight of the stabilized composition. A particularly advantageous range for polyolefins, such as polypropylene is from about 0.1% to about 1%.

Although the polymers are useful as stabilizers per se, their greatest importance resides in the ability to vastly improve the effectiveness of numerous other compounds especially phenolic compounds, which are used as stabilizers for organic materials normally subject to deterioration. Thus, the compounds of this invention may be classified as "synergists" since when they are combined with stabilizers they exhibit the ability to increase the total stabilization to a degree far exceeding that which could be expected from the additive properties of the individual components. The stabilizers with which the compounds of this invention may be combined are, generally, phenolic triazines, phenolic phosphonates, phenolic esters and phenolic hydrocarbons. The various classes of antioxidants are exemplified below.

(1) Phenolic compounds having the general formula $$Q-(CH_2)_w-A$$

wherein Q is

A is —CR(COOR″)$_2$

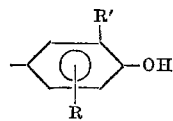

R is hydrogen or lower alkyl
R′ is lower alkyl
R″ is an alkyl group having from 6 to 24 carbon atoms
w is an integer from 1 to 4.

Illustrative examples of the compounds shown above are

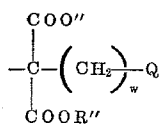

di-n-octadecyl(3-t-butyl-4-hydroxy-5-methylbenzyl)malonate
di-n-octadecyl α(3-t-butyl-4-hydroxy-5-methylbenzyl)malonate which is disclosed in the Netherlands Pat. No. 6711199, Feb. 19, 1968
di-n-octadecyl - α,α′ - bis - (3-t-butyl-4-hydroxy-5-methylbenzyl)malonate which is disclosed in the Netherlands Pat. No. 6803498, Sept. 18, 1968.

(2) Phenolic compounds having the general formula

Q—R

Illustrative examples of the compounds shown above are 2,6-di-t-butylphenyl
2,4,6-tri-t-butylphenol
2,6-dimethylphenol
2-methyl-4,6-di-t-butylphenol and the like.

(3) Phenolic compounds having the formula $$Q-C_wH_{2w}-Q$$

2,2′-methylene-bis(6-t-butyl-4-methylphenol)
2,2′-methylene-bis(6-t-butyl-4-ethylphenol)
4,4′-butylidene-bis(2,6-di-t-butylphenol)
4,4′-(2-butylidene)-bis(2-t-butyl-5-methylphenol)
2,2′-methylene-bis[6-(1-methylcyclohexyl)-4-methylphenol]

and the like.

(4) Phenolic compounds having the formula

R—O—Q

Illustrative examples of such compounds are 2,5-di-t-butylhydroquinone
2,6-di-t-butylhydroquinone
2,6-di-t-butyl-4-hydroxyanisole (5) Phenolic compounds having the formula

Q—S—Q

Illustrative examples of such compounds are 4,4′-thiobis-(2-t-butyl-5-methylphenol)
4,4′-thiobis-(2-t-butyl-6-methylphenol)
2,2′-thiobis-(6-t-butyl-4-methylphenol)

(6) Phenolic compounds having the formula $$Q-(CH_2)_w-S-(CH_2)_w-\overset{O}{\overset{\|}{C}}-OR''$$

Illustrative examples of such compounds are octadecyl-(3,5-dimethyl-4-hydroxybenzylthio)-acetate
dodecyl-(3,5-di-t-butyl-4-hydroxybenzylthio)-propionate (7) Phenolic compounds having the formula

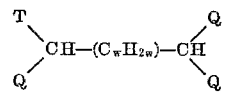

wherein T is hydrogen, R or Q as defined above.

Illustrative examples of such compounds are 1,1,3-tris(3,5-dimethyl-4-hydroxyphenyl)-propane
1,1,3-tris(5-t-butyl-4-hydroxy-2-methylphenyl)-butane
1,1,5,5-tetrakis-(3′-t-butyl-4′-hydroxy-6′-methylphenyl)-n-pentane (8) Phenolic compounds having the formula

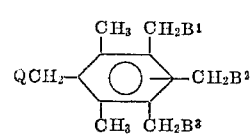

wherein B$^1$, B$^2$ and B$^3$ are hydrogen, methyl or Q, provided that when B$^1$ and B$^3$ are Q then B$^2$ is hydrogen or methyl and when B$^3$ is Q then B$^1$ and B$^2$ are hydrogen or methyl.

Illustrative examples of such compounds are 1,4-di(3,5-di-t-butyl-4-hydroxybenzyl)-2,3,5,6-tetramenthylbenzene
1,3,5-tri(3,5-di-t-butyl-4-hydroxybenzyl)-2,4,6-trimethylbenzene (9) Phenolic compounds having the formula

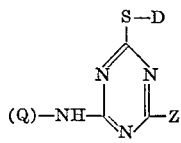

wherein

Z is NHQ, —S—D or —O—Q
D is an alkyl group having from 6–12 carbon atoms or —($C_wH_{2w}$)—S—R".

Illustrative examples of such compounds are 2,4-bis(n-octylthio)-6-(3,5-di-t-butyl-4-hydroxyaniline)-1,3,5-triazine
6-(4-hydroxy-3-methyl-5-t-butylanilino-2,4-bis-(n-octylthio)-1,3,5-triazine
6-(hydroxy-3,5-dimethylanilino)-2,4-bis-(n-octylthio)-1,3,5-triazine
6-(4-hydroxy-3,5-di-t-butylanilino)-2,4-bis-(n-octylthioethylthio)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4-bis(4-hydroxy-3,5-di-t-butylanilino)-6-(n-octylthio)-1,3,5-triazine.

The above phenolic triazine stabilizers are more fully described in U.S. 3,255,191.

(10) Phenolic compounds having the formula

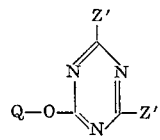

wherein Z' is —O—Q, —S—D or —S—($C_wH_{2w}$)—SD.

Illustrative examples of such compounds are 2,3-bis-(3,5-di-t-butyl-4-hydroxyphenoxy)-6-(n-octylthio)-1,3,5-triazine
2,4,6-tris-(4-hydroxy-3,5-di-t-butylphenoxy)-1,3,5-triazine
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
6-(4-hydroxy-3,5-di-t-butylphenoxy)-2,4-bis-(n-octylthiopropylthio)-1,3,5-triazine
6-(4-hydroxy-3,5-di-t-butylphenoxy)-2,4-bis-(n-dodecylthioethylthio)-1,3,5-triazine
2,4-bis-(4-hydroxy-3,5-di-t-butylphenoxy)-6-butylthio-1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-dodecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5-triazine
2,4-bis-(4-hydroxy-3,5-di-t-butylphenoxy)-6-(n-dodecylthioethylthio)-1,3,5-triazine.

The above phenolic triazine stabilizers are more fully described in U.S. 3,255,191.

(11) Phenolic compounds having the formula $$\left[ Q-C_xH_{2x}-COO-C_xH_{2x}- \right]_p R'''-(R)_{4-p}$$

wherein p is an integer from 2 to 4 and
R''' is a tetravalent radical selected from
 aliphatic hydrocarbons having from 1 to 30 carbon atoms
 aliphatic mono and dithioethers having from 1 to 30 carbon atoms
 aliphatic mono and diethers having from 1 to 30 carbon atoms.

Illustrative examples of such compounds are

Sub-class I n-Octadecyl 3-(3,5-di-t-butyl-4-hydroxyphenyl)-propionate
n-Octadecyl 3,5-di-t-butyl-4-hydroxyphenylacetate
n-Octadecyl 3,5-di-t-butyl-4-hydroxybenzoate
n-Hexyl 3,5-di-t-butyl-4-hydroxyphenylbenzoate
n-Dodecyl 3,5-di-t-butyl-4-hydroxyphenylbenzoate
Neo-dodecyl 3-(3,5-di-t-butyl-4-hydroxyphenyl)-propionate
Dodecyl β-(3,5-di-t-butyl-4-hydroxyphenyl)-propionate
Ethyl α-(4-hydroxy-3,5-di-t-butylphenyl)-isobutyrate
Octadecyl α-(4-hydroxy-3,5-di-t-butylphenyl)-isobutyrate
Octadecyl α-(4-hydroxy-3,5-di-t-butylphenyl)-propionate Sub-class II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenylacetate
2-(n-octadecylthio)ethyl 3,5-di-t-butyl-4-hydroxy benzoate
2-(2-hydroxyethylthio)ethyl 3,5-di-t-butyl-4-hydroxybenzoate
2,2'-thiodiethanol bis(3,5-di-t-butyl-4-hydroxyphenyl) acetate
Diethyl glycol bis-[3,5-di-t-butyl-4-hydroxyphenyl) propionate]
2-(n-octadecylthio)ethyl 3-(3,5-di-t-butyl-4-hydroxyphenyl)propionate
2,2'-thiodiethanol-bis-3-(3,5-di-t-butyl-4-hydroxyphenyl)propionate
Stearamido N,N-bis-[ethylene 3-(3,5-di-t-butyl-4-hydroxyphenyl)propionate]
n-Butylimino N,N-bis-[ethylene 3-(3,5-di-t-butyl-4-hydroxyphenyl)propionate]
2-(2-stearoyloxyethylthio)ethyl 3,5-di-t-butyl-4-hydroxybenzoate
2-(2-hydroxyethylthio)ethyl 7-(3-methyl-5-t-butyl-4-hydroxyphenyl)heptanoate
2-(2-stearoyloxyethylthio)ethyl 7-(3-methyl-5-t-butyl-4-hydroxyphenyl)heptanoate

Sub-class III 1,2-propylene glycol bis-[3-(3,5-di-t-butyl-4-hydroxyphenyl)propionate]
Ethylene glycol bis-[3-(3-5-di-t-butyl-4-hydroxyphenyl)propionate]
Neopentylglycol bis-[3-(3,5-di-t-butyl-4-hydroxyphenyl)propionate]
Ethylene glycol bis-(3,5-di-t-butyl-4-hydroxyphenylacetate)
Glycerine-1-n-octadecanoate-2,3-bis-(3,5-di-t-butyl-4-hydroxyphenylacetate
Pentaethylthritol-tetrakis-3,3-(3,5-di-t-butyl-4-hydroxyphenyl)propionate
1,1,1-trimethylol-tris-3-(3,5-di-t-butyl-4-hydroxyphenyl)propionate
Sorbitol hexa-[3-(3,5-di-t-butyl-4-hydroxyphenyl)propionate
1,2,3-butanetriol tris-[3-(3,5-di-t-butyl-4-hydroxyphenyl)propionate]
2-hydroxyethyl 7-(3-methyl-5-t-butyl-4-hydroxyphenyl)heptanoate
2-stearoyloxyethyl 7-(3-methyl-5-t-butyl-4-hydroxyphenyl)heptanoate
1,6-n-hexanediol-bis[(3',5'-di-t-butyl-4-hydroxyphenyl)propionate]

The above phenolic ester stabilizers of sub-classes I, II and III are more fully described in U.S. 3,330,859, Ser. No. 354,464, filed Mar. 24, 1964 and Ser. No. 359,460, filed Apr. 13, 1964, respectively.

(12) Phenolic compounds having the formula

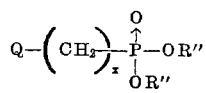

Illustrative examples of such compounds are

Dioctadecyl 3,5-di-t-butyl-4-hydroxybenzylphosphonate
Di-n-octadecyl 3-t-butyl-4-hydroxy-5-methylbenzylphosphonate
Di-n-octadecyl 1-(3,5-di-t-butyl-4-hydroxyphenyl)-ethanephosphonate
Di-n-tetradecyl 3,5-di-t-butyl-4-hydroxybenzylphosphonate
Di-n-hexadecyl 3,5-di-t-butyl-4-hydroxybenzylphosphonate
Didocosyl-3,5-di-t-butyl-4-hydroxybenzylphosphonate
Di-n-octadecyl 3,5-di-t-butyl-4-hydroxybenzylphosphonate It has been found that here the polymer requiring protection against oxidative and ultraviolet degradation is a solid material such as, for example, a polypropylene, polyethylene, nylon, polyacetal, polyurethane, styrene-butadiene rubber, acrylonitrile-butadiene-styrene rubber, and the like, the polymeric antioxidant should have a relatively low molecular weight, i.e., it should be an oligomeric substance, i.e. a polymer having a molecular weight between about 400 and about 6000. The most useful and the highest stabilizing activities are obtained by the use of oligomers having a molecular weight between about 500 and about 1500. Polymeric benzoates having a higher degree of polymerization are not compatible with high molecular weight polymers and are therefore less effective with substrates of this type.

It has also been found that where the polymeric material requiring protection against ultraviolet and oxidative degradation is not a solid material but is a liquid or a semi-liquid such as, for example, an oil or a wax, the polymeric stabilizers can have a higher molecular weight, i.e. a molecular weight in excess of about 6000. With a higher degree of polymerization, there are sometimes secondary advantages that may be achieved. In oils, for instance, high molecular weight polymeric stabilizers act additionally as thickening agents and viscosity index improvers.

As indicated supra, polymeric benzoates of this invention are useful as additives to different polymeric systems. However, it is also possible to copolymerize small amounts of a monomer of this invention with other monomers which form polymers requiring protection against oxidative degradation. In such a case, the monomer moiety of this invention forms an integrated part of the polymer system. Small amounts of the instant monomers can therefore be copolymerized with butadiene-styrene, acrylonitrile - butadiene - styrene, ethylene and other monomers which form polymers that require protection against oxidative degradation. Thus, depending upon the end use, monomer moieties of this invention can be a part of an oligomeric or a high molecular weight polymer system. The amounts of a monomer of this invention that can be copolymerized can vary from about 0.05 to about 5% by weight, and preferably from about 0.1 to about 2%.

The polymeric stabilizers can be incorporated into polymers using conventional procedures. For example, the stabilizers can be incorporated into the substrates by any suitable means, such as by milling the stabilizer on hot or cold mill rolls, in a Banbury mixer or other well-known devices of this nature, or by incorporating it into a molding powder. The antioxidant can even be incorporated into a solution of the polyolefin material which solution can then be employed for the formulation of films, for wet or dry spinning of fibers, monofilaments and the like.

EXAMPLE 1

2-(3,5-di-t-butyl-4-hydroxybenzoyloxy)ethyl methacrylate

To a solution of 13 g. (0.1 mole) of 2-hydroxyethyl methacrylate in 20 g. of dry pyridine was slowly added a solution of 26.8 g. (0.1 mole) of 3,5-di-t-butyl-4-hydroxybenzoyl chloride in 50 g. of dry benzene. During the addition the temperature of the reaction mixture was kept at 5° C. and then allowed to warm up to room temperature. After one hour at room temperature the precipitated pyridine hydrochloride was removed by filtration and the solvent in the filtrate evaporated on a rotary evaporator. The residue was redissolved in ether, washed with 1 normal hydrochloric acid and water. The ether layer was then dried over sodium sulfate, filtered and the ether evaporated. The residue obtained was a yellow, viscous oil which can be distilled at 186–192° C. at 0.05 mm. Hg or can be crystallized from heptane yielding white crystals with a melting point of 71.5–72° C.

*Elemental analysis.*—Calcd. for $C_{21}H_{30}O_5$ (percent): C, 69.58; H, 8.34. Found (percent): C, 69.74; H, 8.34.

The structure was confirmed by IR and NMR.

EXAMPLE 2

2-(3,5-dimethyl-4-hydroxybenzoyloxy)ethyl acrylate

A solution of 15.5 g. (0.133 mole) of 2-hydroxyethyl acrylate in 30 g. of methylene chloride was added to a vigorously stirred solution of 24.65 g. (0.133 mole) of 3,5-dimethyl-4-hydroxybenzoyl chloride in 50 g. of methylene chloride at room temperature. After the addition was completed, the reaction mixture was refluxed for 6 hours, cooled to room temperature and filtered through 100 g. of neutral aluminum oxide to remove traces of unreacted acid chloride. After evaporating the solvent, a yellow oil was obtained which was twice recrystallized from a 4:1 hexane-benzene mixture yielding white crystals with a melting point of 62.5–64° C.

*Elemental analysis.*—Calcd. for $C_{14}H_{16}O_5$ (percent): C, 63.62; H, 6.10. Found (percent): C, 63.52; H, 6.04.

The structure was confirmed by IR and NMR.

EXAMPLES 3–10

Benzoate monomers 3–10 are prepared by esterification of the listed acid chlorides and alcohols employing synthesis methods as described in Example 1 or 2:

EXAMPLES 11–13

Homoplymers and oligomers of 2-(3,5-di-t-butyl-4-hydroxybenzoyloxy)ethyl methacrylate One hundred parts of a mixture of 2-(3,5-di-t-butyl-4-hydroxybenzyloxy)ethyl methacrylate prepared in Example 1 and n-dodecyl mercaptan in molar ratios as indicated in Table I below, 300 parts of benzene and one part of azobisisobutylronitrile were sealed in a vessel under nitrogen and polymerized for 17 hours at 70° C. The

NOTE.—The symbol ∨ means isopropyl group and ✕ t-butyl group.

resulting polymers and oligomers were isolated and characterized as shown in Table I.

TABLE I

| Example | Molar ratio of monomer to mercaptan | Work up procedure | Appearance of polymer | Average mol weight Calcd.[1] | Average mol weight Found[2] |
|---|---|---|---|---|---|
| 11 | ([3]) | Pptd. in 20 x heptane. | White, brittle | | 47,000 |
| 12 | 5:1 | Freeze dried under high vacuum. | White, brittle | 2,004 | 2,070 |
| 13 | 3:1 | Dried high vacuum, 70° C. | Colorless, viscous oil. | 1,283 | 1,400 |

[1] Average mol weight calculated for monomer:mercaptan ratio.
[2] Mol weight found: $\overline{M}n$ by osmometry.
[3] No mercaptan.

EXAMPLE 14

Homopolymer of 2-(3,5-dimethyl-4-hydroxybenzoyloxy) ethyl acrylate 100 parts of a mixture of 2-(3,5-dimethyl-4-hydroxybenzoyloxy)ethyl acrylate and n-dodecyl mercaptan in molar ratios of 10:1; 300 parts of chloroform and 1 part of azobisisobutyronitrile were sealed in an ampul under nitrogen and polymerized for 16 hours at 70° C. The resulting polymer solution was precipitated into 20 times the amount of hexane under vigorous stirring. The precipitated polymer was filtered and dried and was obtained as a white, brittle powder.

*Molecular weight.*—Calcd. (percent): 2844 (calculated from ration moonmer: mercaptan). Found (percent): 3490 ($\overline{M}n$ by osmometry).

EXAMPLE 15

Copolymers of monomers of Examples 1 and 2 and alkyl acrylates or alkyl methacrylates Employing the polymerization procedure described in Examples 11–13 mixtures of 2 - (3,5-di-t-butyl-4-hydroxybenzoyloxy)ethyl methacrylate or 2-(3,5-dimethyl-4-hydroxybenzoyloxy)ethyl acrylate and alkyl acrylates or alkyl methacrylates, preferably with alkyl groups equal or larger than butyl, are copolymerized preferably in the presence of mercaptans as chain transfer agents so that copolymers with molecular weights from 1000 to 6000 are obtained. Preferred percentages of the benzoate monomers in the copolymers range from 30 to 90%. Preferred comonomers are n-butyl, 2-ethylhexyl, n-octyl, n-dodecyl and stearyl acrylates or methacrylates. Preferred mercaptans are n-octyl, n-dodecyl and n-hexadecyl mercaptan. The described copolymers have an appearance ranging from colorless, high viscous oils to colorless, tacky polymers and due to the long alkyl groups of the acrylic comonomers have an excellent compatability in polymers into which they are incorporated, such as polyethylene, polypropylene and other hydrocarbon polymers.

EXAMPLE 16

Homopolymers of monomers of Examples 3, 4 and 5

Homopolymers of monomers of Examples 3, 4 and 5 with average molecular weight ranging from 1200 to 40,000 are prepared by employing the polymerization procedure and the ratios of n-dodecyl mercaptan described in Examples 11 to 13. All homopolymers with high molecular weights are white, brittle powders whereas oligomers with molecular weights below 1800 are tacky, high viscous oils.

EXAMPLE 17

Alternating copolymers of monomers of Examples 6, 7 and 8

100 parts of a mixture of equimolar amounts of benzoate monomers of Examples 6, 7 or 8 and a comonomer as listed below, 300 parts of chloroform and 1 part of azobisisobutyronitrile are sealed in an ampul under nitrogen and polymerized for 16 hours at 70° C. The resulting polymer solutions are diluted to 10% solutions in chloroform and precipitated into 20 times the amount of methanol. The alternating copolymers are obtained as white, brittle powders. Comonomers which are employed to give alternating copolymers with the fumarate and itaconate monomers of Examples 6, 7 and 8 are:

vinyl ethers such as methyl, ethyl, butyl, hexyl, 2-methoxyethyl and 2-chloroethyl vinyl ether vinyl esters such as vinyl acetate, vinyl propionate, vinyl benzoate and isopropenyl acetate α-olefins such as isobutene, styrene and substituted styrenes such as p-chlorostyrene.

EXAMPLE 18

Copolymers of monomers of Examples 9 and 10 and styrene

Copolymers containing 1 to 10% by weight of monomers of Examples 9 or 10 and 90–99% by weight of styrene are prepared by employing the polymerization procedure described in Example 11.

The oxidation of most polymers is so slow at ambient temperatures, even in the absence of antioxidants, that testing of the effects of antioxidants must be conducted at high temperatures to yield results within a convenient time. The tests conducted on the materials listed in the following tables were conducted in a tubular oven with an air flow of 400′ per minute at an oven temperature of 150° C. The oven aging is set out in hours. The expression "Failure" indicated the first sign of decomposition of the polymer.

SAMPLE PREPARATION

In preparing the sample for testing, unstabilized polypropylene powder is thoroughly blended with the indicated polymeric antioxidant. The blended material is thereafter milled on a two roller mill at a temperature of 182° C. for six minutes after which time the stabilized polypropylene is sheeted from the mill and allowed to cool. The milled polypropylene sheet which has been stabilized is then cut into small pieces and pressed for seven minutes on a hydraulic press at 218° C. and 174 pounds per square inch pressure. The resultant sheet of 25 mil thickness is then tested for resistance to accelerated aging in the above described tubular oven. The stability is measured by the over life of a sample (in hours) before showing first sign of physical decomposition, such as powdery disintegration when small pressure is applied.

EXAMPLE 19

Evaluation of polymeric stabilizers in an oven aging test

Polypropylene plaque samples were prepared as described above employing stabilizers in the amounts indicated in Table II below. The plaques were then evaluated for resistance to thermal degradation in a tubular oven at 150° C. with an airflow of 400 ft./min.

TABLE II

| Polymeric stabilizers (PST) | Percent PST | Percent IRGANOX 1093[1] | Hours to failure |
|---|---|---|---|
| Prepared in Example 12 | 0.5 | | 225 |
| Do | 0.5 | 0.1 | 480 |
| Prepared in Example 13 | 0.5 | | 460 |
| Do | 0.5 | 0.1 | 1,000 |
| | | 0.1 | 40 |

[1] IRGANOX 1093 is a commercial antioxidant, dioctadecyl 3,5-di-t-butyl-4-hydroxybenzylphosphonate.

EXAMPLE 20

Evaluation of polymeric stabilizers under actinic light

In this example the light stabilizing properties of the polymer prepared in Example 13 are evaluated. The test is conducted in a FS/BL unit, basically of American Cyanamid design, which consist of 40 tubes of alternating fluorescent sun lamps and black lights (20 of each). The 25 mil sample plaques, prepared as described above, which are mounted on white cardboard stock are placed on a rotating drum 2 inches from the bulbs. The plaques are exposed in the FS/BL unit until they become sufficiently brittle to break cleanly when bent 180°. The results are recorded as hours of exposure to embrittlement. The data is summarized below in Table III.

TABLE III

| Polymeric stabilizers (PST) | Percent | | | Hours to failure |
|---|---|---|---|---|
| | PST | UV-2 [1] | IRGANOX 1003 | |
| Prepared in Example 13 | 0.5 | | 0.1 | 450 |
| Do | 0.25 | 0.25 | 0.1 | 620 |
| | | 0.25 | 0.1 | 110 |

[1] UV-2 is an ultraviolet absorber, 2(2'-hydroxy-3',5'-di-t-butylphenyl)-7-chlorobenzotriazole.

EXAMPLE 21

A stabilized mineral oil composition is prepared by incorporating into a refined mineral oil of 183 S.U.S. at 100° F. (Regal Oil B, Texas Company) 0.05% by weight of the copolymer of 2-(3,5-di-t-butyl-4-hydroxybenzoyloxy)ethyl methacrylate and stearyl methacrylate (50:50 mixture) having a molecular weight of 1500.

EXAMPLE 22

Paraffin wax (M.P. 125–128° F.) is stabilized by incorporating therein 0.10% by weight of a copolymer of 2-(3,5-dimethyl-4-hydroxybenzoyloxy)ethyl acrylate and n-octyl methacrylate (50:50 mixture) having a molecular weight of 2000. An improved stabilization is obtained when additionally 0.1 by weight of octadecyl $\beta$-(3,5-di-t-butyl-4-hydroxyphenyl)propionate is added.

EXAMPLE 23

A stabilized high temperature lubricating oil is prepared by incorporating 2% by weight of an alternating copolymer of bis[2-(3 - methyl-5-t-butyl-4-hydroxybenzoyloxy)ethyl] fumarate and n-hexyl vinyl ether having a molecular weight of about 2,500 into lubricant, which comprises diisoamyladipate. The stabilization of said lubricant is further improved by the addition of 2,4-bis-(3,5-di-t-butyl-4-hydroxyphenoxy)-6-(n-octylthio)-1,3,5-triazine.

EXAMPLE 24

High impact polystyrene resin containing elastomer (i.e., butadiene-styrene) is stabilized against loss of elongation properties by incorporation of 0.5% by weight of the polymer of Example 12 and 1.0% by weight of tetrakis-[3-(3',5'-di-t - butyl - 4' - hydroxyphenylpropionyloxymethyl)]methane.

Similar results are obtained with terpolymer of acrylonitrile-butadiene-styrene.

EXAMPLE 25

A polyethylene composition is prepared by adding to polyethylene 0.2% by weight of carbon black, 0.13% by weight of the polymer of Example 13 and 0.1% by weight of 2,4-bis-(4-hydroxy-3,5-di-t-butylphenoxy) - 6 - (n-octylthioethylthio)-1,3,5-triazine. The thus stabilized polyethylene exhibits much more stability than polyethylene containing only carbon black or carbon black with said phenolic stabilizer.

What is claimed is:

1. Homopolymers having the repeating unit

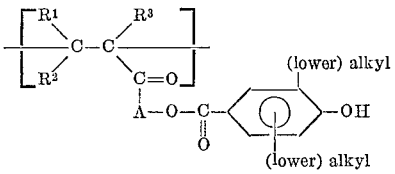

wherein $R^1$, $R^2$ and $R^3$ are independently hydrogen, lower alkyl, phenyl, benzyl or a group

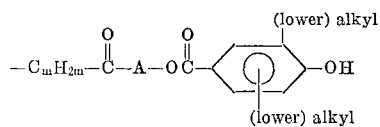

where $m = 0$ or $1$

A is a bivalent group selected from

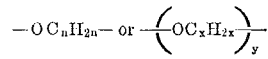

where $n = 2$ to $12$, $x$ and $y = 2$ to $4$.

2. Homopolymers of claim 1 wherein both said (lower) alkyl group are tertiary and ortho to hydroxy group.

References Cited

UNITED STATES PATENTS

| 3,116,305 | 12/1963 | Morris | 260—410.5 |
| 3,398,184 | 8/1968 | Gibb | 260—486 |
| 3,429,852 | 2/1969 | Skoultchi | 260—47 |
| 3,497,549 | 2/1970 | Dexter | 260—473 |

JOSEPH L. SCHOFER, Primary Examiner

C. A. HENDERSON, Jr., Assistant Examiner

U.S. Cl. X.R.

99—163; 260—45.8 N, 45.85, 45.96, 80 C, 473 S, 823, 857, 862, 887, 897, 899